(12) United States Patent
Wright

(10) Patent No.: US 11,599,515 B2
(45) Date of Patent: *Mar. 7, 2023

(54) SYSTEMS AND METHODS FOR MANAGING DATA

(71) Applicant: Comcast Cable Communications, LLC, Philadelphia, PA (US)

(72) Inventor: Garrett Buckman Wright, Bensalem, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,063

(22) Filed: Jul. 22, 2020

(65) Prior Publication Data

US 2021/0209085 A1 Jul. 8, 2021

Related U.S. Application Data

(63) Continuation of application No. 13/801,548, filed on Mar. 13, 2013, now Pat. No. 10,776,335.

(51) Int. Cl.
*G06F 16/22* (2019.01)

(52) U.S. Cl.
CPC .............................. *G06F 16/2255* (2019.01)

(58) Field of Classification Search
CPC ............ G06F 16/285; G06F 16/24539; G06F 16/24556
USPC ....................................................... 707/698
See application file for complete search history.

(56) References Cited

U.S. PATENT DOCUMENTS

| 5,613,109 | A | * | 3/1997 | Yamauchi | G11B 27/105 |
| 5,966,120 | A | | 10/1999 | Arazi et al. | |
| 6,112,181 | A | * | 8/2000 | Shear | G06Q 30/06 705/7.29 |
| 6,754,662 | B1 | * | 6/2004 | Li | H04L 45/00 707/693 |
| 6,788,648 | B1 | * | 9/2004 | Peterson | H04L 45/00 370/386 |
| 7,769,024 | B1 | * | 8/2010 | Orr | H04L 45/74 370/395.31 |
| 7,916,728 | B1 | * | 3/2011 | Mimms | H04L 45/54 370/392 |
| 8,045,470 | B2 | | 10/2011 | Zseby | |
| 8,494,897 | B1 | | 7/2013 | Dawson et al. | |
| 9,294,378 | B2 | * | 3/2016 | Jackowski | H04L 43/0894 |
| 9,378,784 | B1 | | 6/2016 | Vu et al. | |
| 9,613,363 | B2 | * | 4/2017 | Cochran | G06Q 30/0204 |
| 2004/0059544 | A1 | | 3/2004 | Smocha et al. | |
| 2007/0076606 | A1 | | 4/2007 | Olesinski et al. | |
| 2009/0063869 | A1 | | 3/2009 | Kohavi et al. | |

(Continued)

*Primary Examiner* — James Trujillo
*Assistant Examiner* — Fariborz Khoshnoodi
(74) *Attorney, Agent, or Firm* — Ballard Spahr LLP

(57) ABSTRACT

Systems and methods for data management are disclosed. One method can comprise receiving first data from one or more data sources and forming a classification group from the one or more data sources based upon one or more classifiers. The method can also comprise generating an identifier for the classification group by applying a function to the first data and/or the one or more classifiers. Second data can be received from the one or more data sources of the classification group and the second data can be associated with the identifier of the classification group.

20 Claims, 10 Drawing Sheets

(56) References Cited

U.S. PATENT DOCUMENTS

| | | | |
|---|---|---|---|
| 2009/0292816 A1* | 11/2009 | Etchegoyen | H04L 67/125 709/229 |
| 2009/0307492 A1* | 12/2009 | Cao | H04L 9/0844 713/169 |
| 2011/0225168 A1* | 9/2011 | Burroughs | H04L 45/7453 707/747 |
| 2012/0008499 A1* | 1/2012 | Stanwood | H04L 47/623 370/235 |
| 2012/0023522 A1* | 1/2012 | Anderson | H04N 21/26233 725/35 |
| 2013/0086546 A1* | 4/2013 | Nishio | G06F 30/394 716/130 |
| 2013/0159505 A1 | 6/2013 | Mason et al. | |
| 2013/0191723 A1 | 7/2013 | Pappas et al. | |
| 2013/0279794 A1 | 10/2013 | Greenberg et al. | |
| 2014/0107925 A1 | 4/2014 | Chang et al. | |
| 2014/0129626 A1 | 5/2014 | Smadi | |

* cited by examiner

SYSTEMS AND METHODS FOR MANAGING DATA

CROSS REFERENCE TO RELATED PATENT APPLICATIONS

This application is a continuation of U.S. application Ser. No. 13/801,548, filed Mar. 13, 2013, which is herein incorporated by reference in its entirety.

BACKGROUND

Efficient management of large datasets is time consuming and computationally complex. Validation of collected data can be challenging due, at least in part, to the computational complexity required to frequently check and compare the multitude of possible failure combinations. For example, data can fail to meet a data integrity standard or computer engineering metric type standard. The present disclosure addresses these and other shortcomings of managing data.

SUMMARY

It is to be understood that both the following general description and the following detailed description are exemplary and explanatory only and are not restrictive, as claimed. Provided are methods and systems for managing data. In an aspect, the disclosed methods and systems can be implemented to validate data.

In an aspect, methods can comprise receiving first data from one or more data sources. As an example, a classification group can be formed. The classification group can comprise a grouping of one or more data sources, devices, and/or data received from or sent to the same. The classification group can be formed based upon one or more classifiers. An identifier can be generated for the classification group by applying a function such as a hash function to one or more of the first data and the one or more classifiers. The function can be any routine, sub-routine, process, algorithm, formula, character relationship, or the like. Second data can be received from the one or more data sources of the classification group. The second data can be associated with the identifier of the classification group.

In another aspect, methods can comprise receiving first data from one or more devices. A first classification group can be formed from the one or more devices based upon a first group of one or more classifiers. A second classification group can be formed from the one or more devices based upon a second group of one or more classifiers. A first identifier can be generated for the first classification group by applying a hash function to one or more of the first data and the first group one or more classifiers. A second identifier can be generated for the second classification group by applying a hash function to one or more of the first data and the second group of one or more classifiers. Second data received from a select device of the one or more devices can be monitored. If the select device is part of the first classification group, the second data can be associated with the first identifier. If the select device is part of the second classification group, the second data can be associated with the second identifier.

In an aspect, methods can comprise receiving first data from a plurality of devices. A plurality of classification groups can be formed based upon one or more classifiers, each of the classification groups comprising one or more devices of the plurality of devices. An identifier can be generated for each of the classification groups by applying a hash function to one or more of the first data and the one or more classifiers. Second data from the plurality of devices can be monitored. An event based upon the monitoring of the second data can be detected. A select classification group of the plurality of classification groups can be identified based upon one or more of the generated identifiers.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
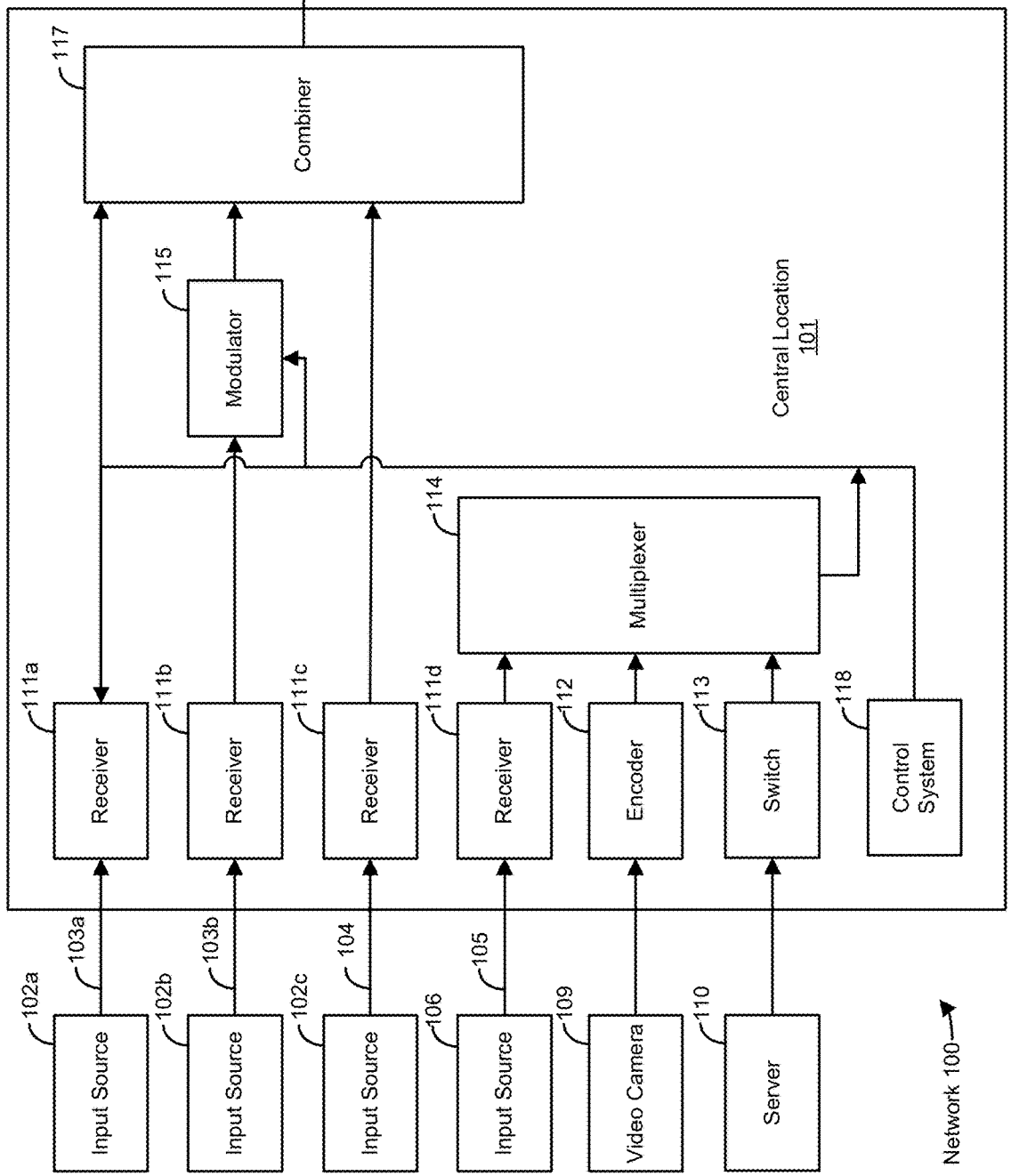
FIG. 1 is a block diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, data relating to one or more devices can be accessed or received. The data can be organized by applying a group of classifiers to the data. An identifier for group of classifiers can be generated by applying a function, such as a hash function, to the classifiers that classify the data received from the one or more devices. As an example, first data can be classified by classifiers such as device location=WEST and port type=10gige. The classifiers can be processed using a hash function to generate a hash token. The hash token can be used to represent the classifiers used to classify the first data. Accordingly, when second data is accessed or received and then classified using the same classifiers (i.e., device location=WEST and port type=10gige), the resultant hash token of the classifiers of the second data would be the same as the hash token of the classifiers of the first data. Accordingly, the hash token can identify groups of one or more classifiers in a consistent, repeatable manner with minimized computation.

FIG. 1 illustrates various aspects of an example network in which the present methods and systems can operate. The present disclosure relates to systems and methods for advertising. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.) which can receive content (e.g., data, input programming, and the like) from multiple sources. The central location 101 can combine the content from the various sources and can distribute the content to user (e.g., subscriber) locations (e.g., location 119) via distribution system 116. In an aspect, content can comprise advertisements such as video commercials, audio, and/or images. As a further example, interactive advertisements can be processed at the central location 101 or other system or device.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include, for example, a single content item or a multiplex that includes several content items. In an aspect, the central location 101 can create and/or receive application, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or home communications terminal (CT) can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as network storage.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating audio or visual feedback, tactile feedback, and the like.

In an aspect, the user device 124 can be a CT, a set-top box, a television, a computer, a smartphone, a laptop, a tablet, a multimedia playback device, a portable electronic device, and the like. As an example, the user device 124 can be an Internet Protocol compatible device for receiving signals via a network 127 such as the Internet or some other communications network for providing content to the user. It is understood that other display devices and networks can be used. It is further understood that the user device 124 can be a widget or a virtual device for displaying content in a picture-in-picture environment, such as on the display device 121, for example. As an example, a storage device 125 can be in communication with one or more of the user device 124 and the central location 101 to send/receive content therebetween. As a further example, the storage device 125 can be located remotely from the user device 124, such as a network storage medium.

In an aspect, a management system 126 or device can be in communication (e.g., over a network, communications channel, VoIP, etc.) with one or more of the CT 120, the user device 124, and other devices, such as, for example, smart phones, computers, and network devices. As an example, the management system 126 can be configured to poll one or more devices in communication therewith. As a further example, the management system 126 can be configured to transmit and/or receive data relating to one or more devices.

In an aspect, the management system 126 can poll (e.g., interrogate, query, communicate with, etc.) one or more devices to determine (e.g., measure) one or more parameters such as operational metrics relating to the one or more devices. As an example, parameters can comprise capacity, bandwidth utilization, resource utilization, buffer status, percent utilization, data rate, congestion, and the like. As a further example, the parameters can be measured continuously or periodically such as every 30 seconds, every minute, every five minutes, every hour, every day, every week, and/or based upon other time periods.

In an aspect, the management system 126 can be configured to classify the measured parameters of the one or more devices measured. As an example, parameters can be classified based on one or more of a port type, device name, port name, geographic location, converged regional area network (CRAN), market location, device type, user association, and the like. Other classifiers can be related to hardware, firmware, or software such as vendor, model, version, or revision, or a combination thereof. Soft classifiers such as those defined by user demographics, products, services, and the like or generated from relational analysis of system results (feedback) can also be applied. As a further example, the parameters can be stored based upon the classification. In an aspect, one or more classification groups can be formed based upon one or more classifiers. As an example, each of the classification groups can comprise data relating to one or more devices.

In an aspect, the management system 126 can be configured to generate one or more identifiers for the data received by the management system 126. As an example, an identifier can be generated for each of the classification groups. As another example, the identifier can be generated by applying a function such as a hash function to the data received from one or more devices of each of the classification groups. The function can be any routine, sub-routine, process, algorithm, formula, character relationship, or the like. The function can be configured to map in input data having variable character length to an output data having a fixed character length. As such, a classification group can be identified by a hash token as a result of applying the hash function to the data received from one or more devices of each of the classification groups.

In another aspect, the identifier can be generated by applying a function, such as a hash function, to the classifiers that classify the data received from the one or more devices. As an example, first data can be classified by classifiers such as device location=WEST and port type=10gige. The classifiers can be processed using a hash function to generate a hash token. The hash token can be used to represent the classifiers used to classify the first data. Accordingly, when second data is classified using the same classifiers (i.e., device location=WEST and port type=10gige), the resultant hash token of the classifiers of the second data would be the same as the hash token of the classifiers of the first data. Accordingly, the hash token can identify groups of one or more classifiers in a consistent, repeatable manner with minimized computation. Any number of classifiers can be grouped and processed to generate the identifier. In an aspect, the identifiers generated by the hash function can be used to retrieve and/or analyze the data classified by the one or more classifiers. As an example, a hash function where the expected hash collision is sufficiently below the cardinality of the power set of the sets of classifiers can be used. In practice, these hash functions can include common cryptographic hash functions such as MD5, SHA1, SHA2 (SHA224, SHA256, SHA512), SHA3 and the like. As another example, the resulting hash token is typically a fixed length bitstring which can be represented in binary, HEX, or as an alphanumeric string. As a further example, using the SHA1 hash as implemented in MS SQL Server results in a 160 bit token, such as 0x0000CAC51A24D72831920293D2946F3DABB4A1C0 when represented as a 40 (4 bit) character string. Other functions and resultant bitstrings can be used.

Figure 2:
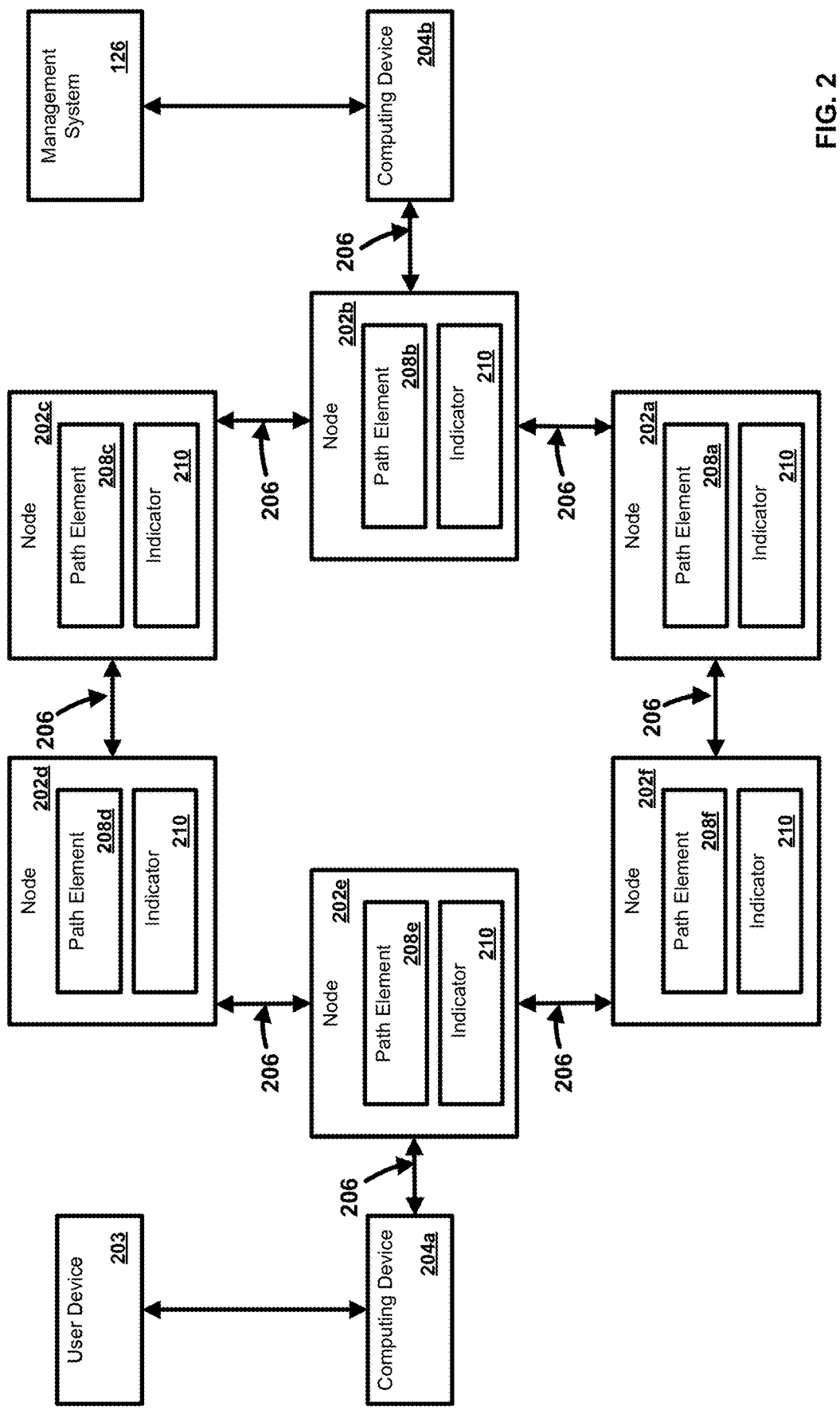
FIG. 2 is a block diagram on an example network.

FIG. 2 illustrates an example system and network. In an aspect, a plurality of nodes 202*a*, 202*b*, 202*c*, 202*d*, 202*e*, 202*f* can be in communication with one or more user devices 203 and/or one or more computing devices 204*a*, 204*b*. One or more of the nodes 202*a*, 202*b*, 202*c*, 202*d*, 202*e*, 202*f* can be a network access point, router, switch, or other communication device. As an example, one or more user devices 203 can be an electronic device such as a computer, a smartphone, a laptop, a tablet, a set top box, a display device, or other device capable of communicating with one or more of the nodes 202*a*, 202*b*, 202*c*, 202*d*, 202*e*, 202*f* of the network. As a further example, one or more computing devices 204*a*, 204*b* can be a server, customer premises equipment (CPE), network interface device (NID), optical networking unit (ONU), headend, terminal server, cable modem terminal system, or other network device. As an example, one or more of the nodes 202*a*, 202*b*, 202*c*, 202*d*, 202*e*, 202*f* can be configured to communicate with another of the nodes 202*a*, 202*b*, 202*c*, 202*d*, 202*e*, 202*f* and/or one or more of the computing devices 204*a*, 204*b* via one or more communication paths 206. In an aspect, the one or more communication paths 206 can comprise one or more uninterrupted communication links, sequential links, pre-defined paths or links, and/or intervening nodes. Links can comprise a single point-to-point connection between two devices or access points. Paths can comprise one or more links. As an example, one or more of the communication paths 206 can comprise one or more of the nodes 202*a*, 202*b*, 202*c*, 202*d*, 202*e*, 202*f*. As a further example, one or more of the nodes 202*a*, 202*b*, 202*c*, 202*d*, 202*e*, 202*f* can be configured as a mesh network. In an aspect, one or more of the communication paths 206 can be configured to transmit one or more services.

In an aspect, one or more path elements 208*a*, 208*b*, 208*c*, 208*d*, 208*e*, 208*f* can comprise information relating to one or more of the communication paths 206. One or more path elements 208*a*, 208*b*, 208*c*, 208*d*, 208*e*, 208*f* can comprise information relating to congestion, path priority, path cost, capacity, bandwidth, signal strength, latency, error rate, path usage, and the like. As an example, the path element 208*a*, 208*b*, 208*c*, 208*d*, 208*e*, 208*f* can be configured to determine and/or generate an indicator 210 such as a value or measurement relating to congestion, path priority, path cost, capacity, bandwidth, signal strength, latency, error rate, path usage, and the like.

In an aspect, the management system 126 can be configured to poll one or more of the user device 203, the computing devices 204*a*, 204*b*, the nodes 202*a*, 202*b*, 202*c*, 202*d*, 202*e*, 202*f*, the path elements 208*a*, 208*b*, 208*c*, 208*d*, 208*e*, 208*f*, and/or other network devices.

Figure 3:
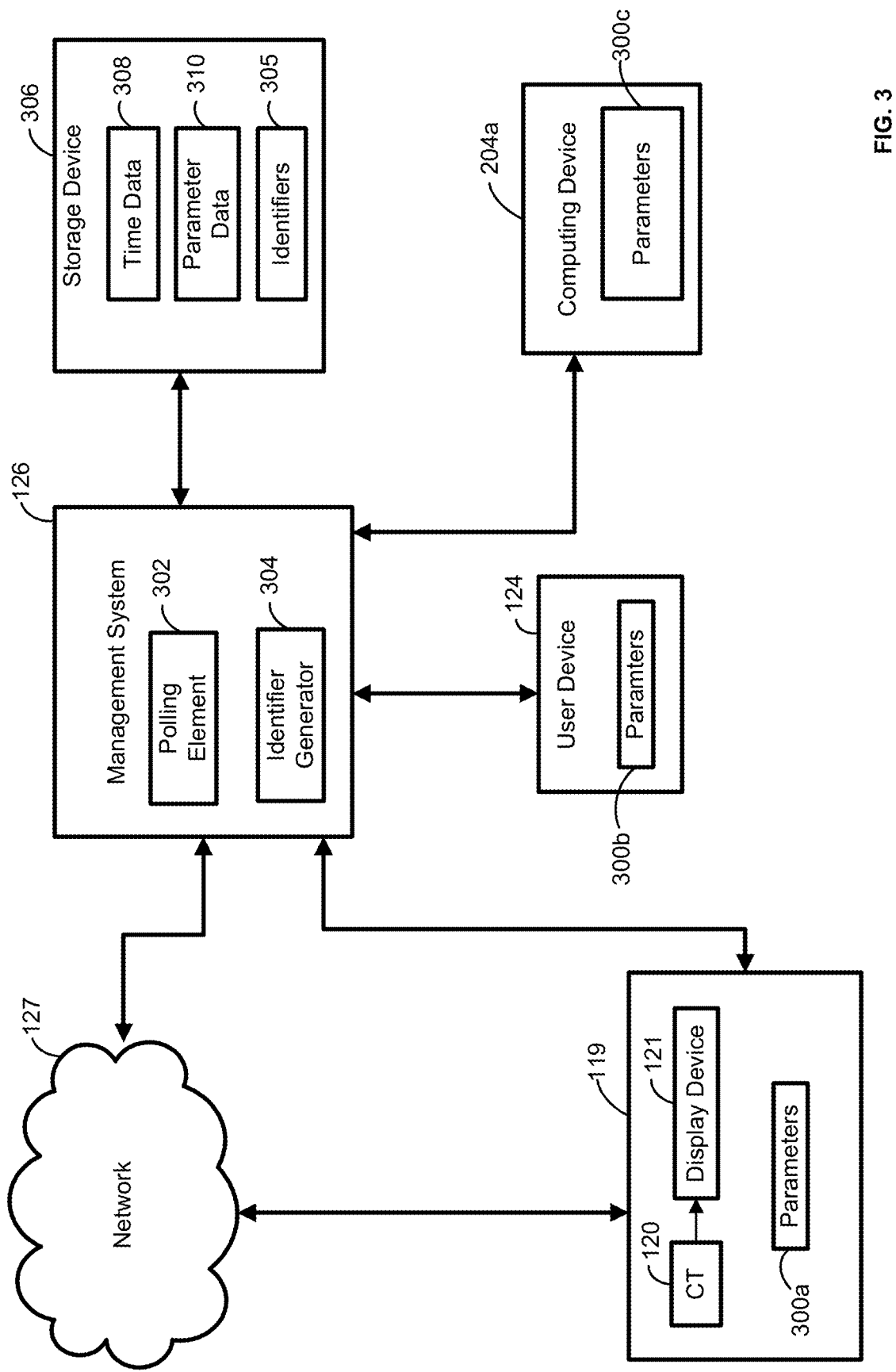
FIG. 3 is a block diagram on an example network.

FIG. 3 illustrates various aspects of an example system in which the present methods can operate. In an aspect, the management system 126 can be configured to poll one or more of the user device 124, the computing devices 204*a*, 204*b*, the CT 120, and/or other networks, systems, and or devices. As an example, the management system 126 can receive data from any number of devices. As a further example, the management system 126 can receive data relating to one or more parameters 300*a*, 300*b*, 300*c*. In an aspect, the parameters 300*a*, 300*b*, 300*c* can relate to one or more devices such as the CT 120, user device 124, computing device 204*a*, 204*b*, and the like. As an example, parameters 300*a*, 300*b*, 300*c* can comprise one or more of capacity, bandwidth utilization, resource utilization, buffer status, percent utilization, data rate, congestion, and the like. As a further example, the parameters 300*a*, 300*b*, 300*c* can be measured continuously or periodically.

In an aspect, the management system 126 can comprise a polling element 302. The polling element 302 can be configured to access (e.g., poll, measure, determine, etc.) or receive data relating to one or more devices to determine one or more parameters 300*a*, 300*b*, 300*c* such as operational metrics relating to the one or more devices measured. As an example, parameters 300*a*, 300*b*, 300*c* can comprise one or more of capacity, bandwidth utilization, resource utilization, buffer status, percent utilization, data rate, congestion, and the like. As a further example, the parameters 300*a*, 300*b*, 300*c* can be accessed (e.g., measured) or received continuously or periodically such as every 30 seconds, every minute, every five minutes, every hour, every day, every week, and/or based upon other time periods.

In an aspect, the management system 126 can be configured to classify the parameters 300*a*, 300*b*, 300*c* of the one or more devices or communication links measured. As an example, parameters 300*a*, 300*b*, 300*c* can be classified based on one or more of a port type, device name, port name, geographic location, converged regional area network (CRAN), market location, device type, user association, and the like. Other classifiers can be related to hardware, firmware, or software such as vendor, model, version, or revision, or a combination thereof. Soft classifiers such as those defined by user demographics, products, services, and the like or generated from relational analysis of this systems results (feedback) can be used. As a further example, the parameters 300*a*, 300*b*, 300*c* can be stored based upon the classification. In an aspect, one or more classification groups can be formed based upon one or more classifiers. As an example, each of the classification groups can comprise data relating to one or more devices.

In an aspect, the management system 126 can comprise an identifier generator 304. The identifier generator 304 can be configured to generate one or more identifiers 305 for the data accessed or received by the management system 126. As an example, the identifier 305 can be generated for each of the classification groups. As another example, the identifier 305 can be generated by applying a function such as a hash function to one or more classifiers associated with a classification group of the data received from one or more devices. As a further example, the identifier 305 can be generated by applying a function such as a hash function to the data (e.g., parameters) received from one or more devices and associated with a classification group. As such, the classification group can be identified by a token (e.g., hash token, string, etc.) as a result of applying the function to one or more of the data and the classifier(s) associated with the classification group.

In an aspect, the management system 126 can be in communication with a storage device 306 or storage medium. The storage device 306 can be disposed remotely from one or more of the control system, the CT 120, the user device 124, and the management system 126. For example, the storage device 306 can be located at central location 101, at a third-party location, and the like. As a further example, the storage device 306 can be integrated or disposed in one or more of the CT 120, the user device 124, and the management system 126. In an aspect, the storage device 306 can be the same storage as storage device 122 or storage device 125.

In an aspect, the storage device 306 can comprise one or more of time data 308, parameter data 310, and/or one or more identifiers 305. Other data can be stored on and retrieved from the storage device 306.

In an aspect, the time data 308 can be a time stamp or other time marker for indicating, for example, a date and/or time associated with one or more of a polling event, a measurement, transmission of content, a request for content, a request for playback, storage of content, deletion of content, or the execution of a particular function. As an example, the time data 308 can comprise any number of time-related entries and/or markers. As a further example, the timing data 308 can comprise one or more of a table of time-related data entries, a timing log, and a database of time-related information. Other information can be stored as the timing data.

In an aspect, the parameter data 310 can comprise one or more parameters 300a, 300b, 300c received or accessed by the management system 126. As an example, parameter data 310 can comprise one or more classification groups. As a further example, the parameter data 310 can be associated with one or more identifiers 305. As an example, parameter data 310 can relate to one or more of capacity, bandwidth utilization, resource utilization, buffer status, percent utilization, data rate, congestion, and the like.

Figure 4:
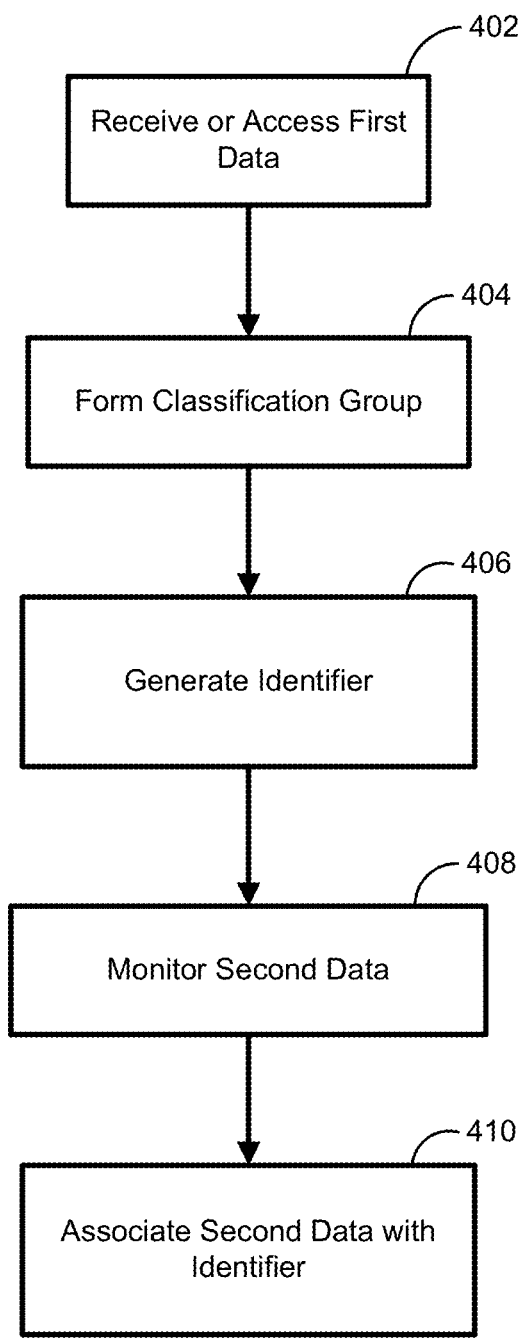
FIG. 4 is a flow chart of an example method.

FIG. 4 illustrates an example method for data management. In step 402, first data can be accessed or received from one or more data sources such as devices or networks. As an example, the first data can be a measured parameter, performance value, or operational parameter, or a combination thereof. As another example, the one or more data sources can comprise one or more user devices, computing devices, and/or network devices. As a further example, parameters can relate to one or more of capacity, bandwidth utilization, resource utilization, buffer status, percent utilization, data rate, congestion, and the like.

In step 404, a classification group can be formed from the one or more data sources based upon one or more classifiers. A classification group can represent one or more data sources (e.g., devices) that have been classified by one or more of the same classifiers. In an aspect, the one or more classifiers can comprise device name, port type, port name, geographic identifier, or market identifier, or a combination thereof.

In step 406, an identifier can be generated for the classification group. In an aspect, the identifier can be generated by applying a function such as a hash function to one or more of the classifiers and/or the first data received from the one or more data sources of the classification group. An identifier can be a bitstring, a character string, token, and the like.

In step 408, second data can be monitored. In an aspect, the second data can be received from the one or more data sources of the classification group. As an example, monitoring the second data can comprise accessing or receiving the second data and comparing the second data and/or a function of the second data to a comparator. The comparator can be historical data, data representing thresholds or standards, expected data, forecast data, and the like. The comparator can be a function of the first data. As a further example, monitoring the second data can comprise accessing or receiving the second data and applying statistical analysis to the second data. Statistical analysis can comprise calculating averages, medians, modes, ranges, variability, deviation, regression, and the like.

In step 410, the second data can be associated with the identifier of the classification group. In an aspect, the second data can have an association with the first data, such as sharing an attribute, source, destination, timing, classification, or the like. In another aspect, the identifier can operate as an identification of a relationship between the second data and the one or more classifiers used to generate the classification group. For example, data collected at different times, but sharing the same classification (e.g., application of classifiers) can be associated with the same identifier. Rather than having to refer to a list of individual classifiers, the identifier can represent the collective list of classifiers that are associated with a particular data. Accordingly, the identifier can identify groups of one or more classifiers in a consistent, repeatable manner with minimized computation.

FIGS. 5A-5D illustrates an exemplary method for data management. In step 502, first data can be accessed or received from one or more data sources such as devices or networks. As an example, the first data can be a measured parameter, performance value, or operational parameter, or a combination thereof. As a further example, the one or more data sources can comprise one or more user devices, computing devices, and/or network devices.

In step 504, a first classification group can be formed from the one or more data sources based upon one or more classifiers. In an aspect, the one or more classifiers can comprises device name, port type, port name, geographic identifier, or market identifier, or a combination thereof. As an example, shown in FIG. 5B, the management system 126 can poll one or more user device 124, 124' to retrieve data relating to one or more parameters 300. As a further example, the parameters 300 of each of the user devices 124, 124' can be classified based on the same classifiers. Accordingly, the parameters 300 can be stored as part of the first classification group.

Returning to FIG. 5A, in step 506, a second classification group can be formed from the one or more data sources based upon one or more classifiers. In an aspect, the one or more classifiers can comprises device name, port type, port name, geographic identifier, or market identifier, or a combination thereof. As an example, the second classification group can comprise the same or different classifiers as the first classification group. As a further example, the second classification group can comprise the same or different values for one or more of the classifiers comprised in the first classification group. In an aspect, shown in FIG. 5C, the management system 126 can poll one or more user device 124, 124' to retrieve data relating to one or more parameters 300, 522. As a further example, the parameters 300 associated with a first user device 124 can be classified based on different classifiers than the parameters 500 associated with the second user device 124'. Accordingly, the parameters 500 of the second user device 124' can be stored as part of the second classification group.

Returning to FIG. 5A, in step 508, a first identifier can be generated for the first classification group. In an aspect, the identifier can be generated by applying a hash function to the first data received from the one or more data sources of the classification group. An identifier can be a bitstring, a character string, token, and the like.

In step 510, a second identifier can be generated for the second classification group. In an aspect, the identifier can be generated by applying a hash function to the first data received from the one or more data sources of the classification group. An identifier can be a bitstring, a character string, token, and the like.

Figure 5A:
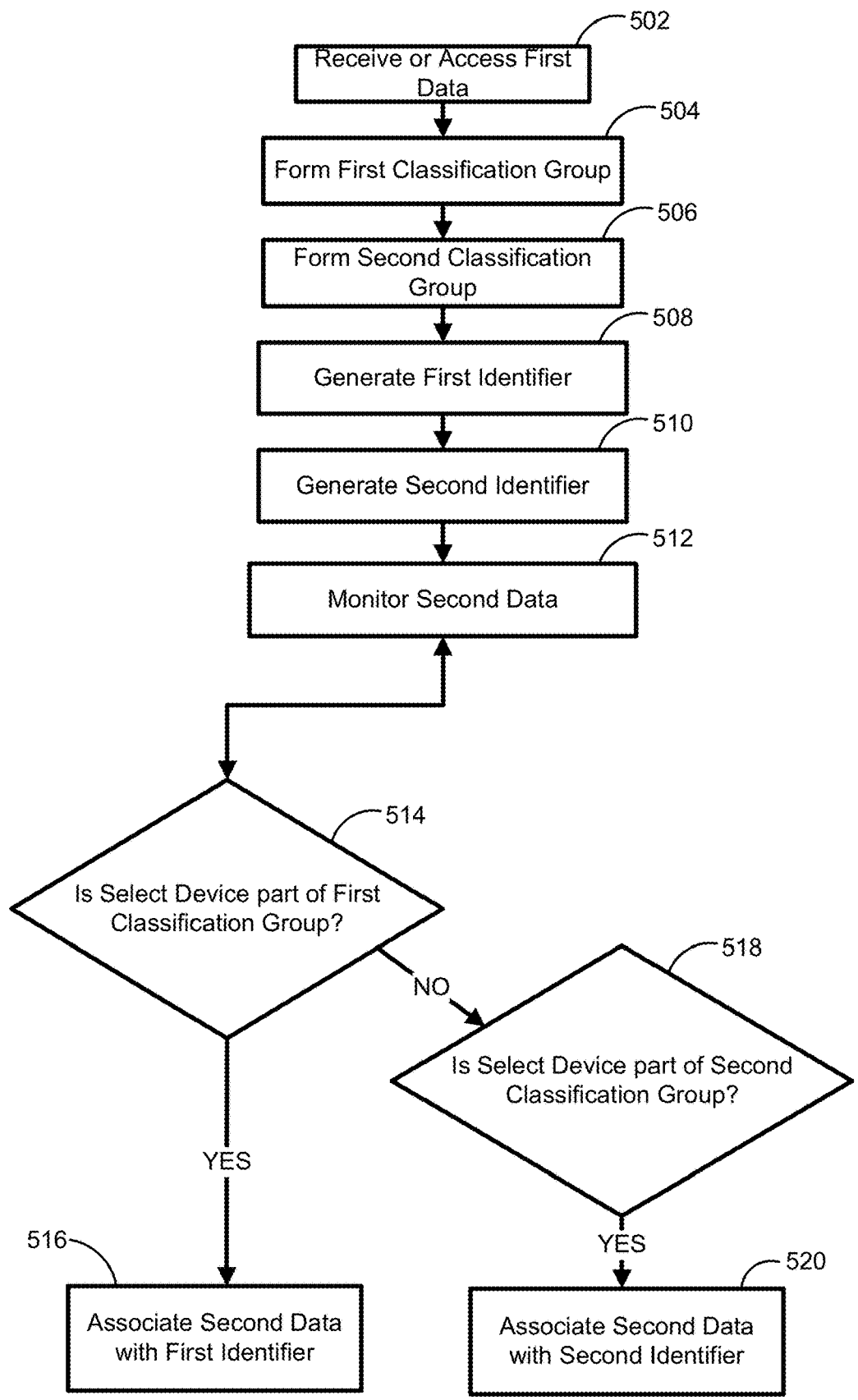
FIG. 5A is a flow chart of an example method.
Figure 5B:
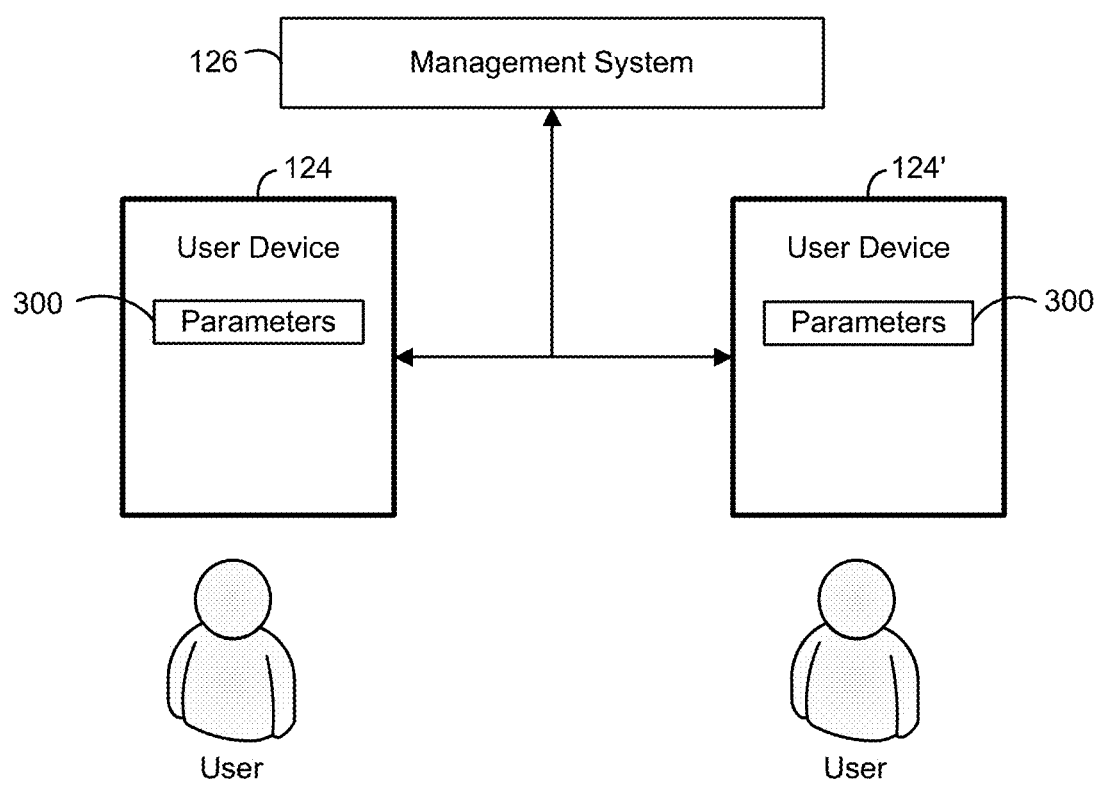
FIG. 5B is a block diagram of an example system.
Figure 5C:
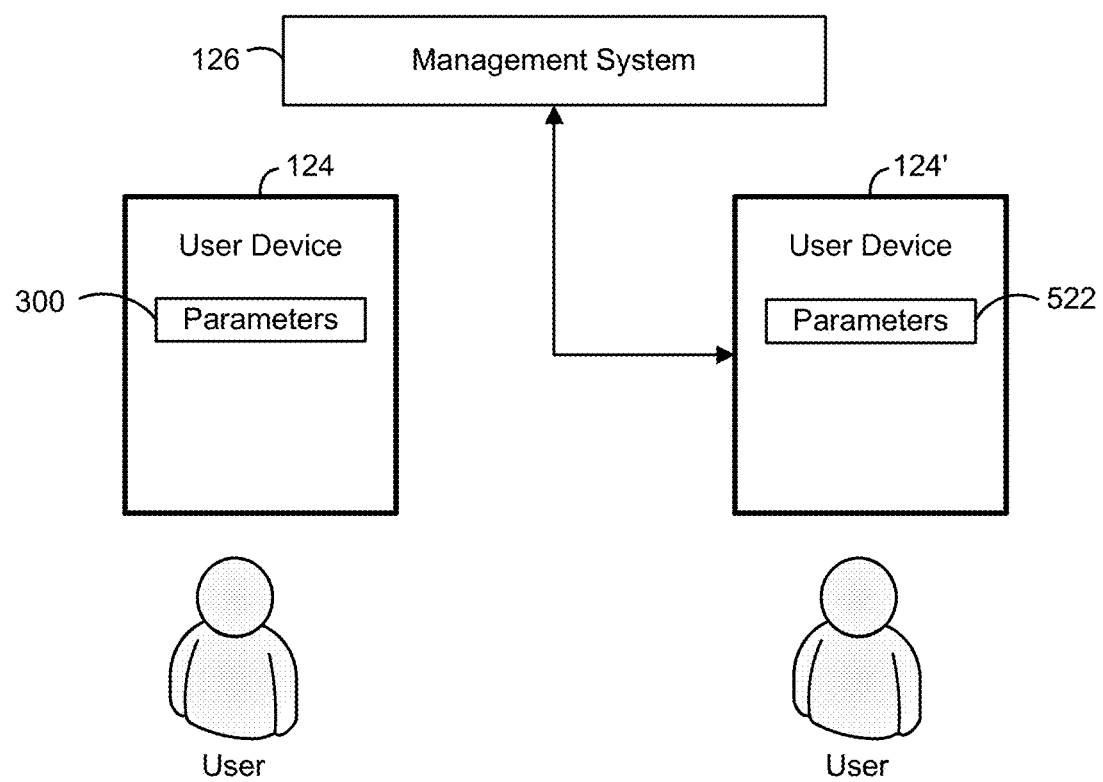
FIG. 5C is a block diagram of an example system.
Figure 5D:
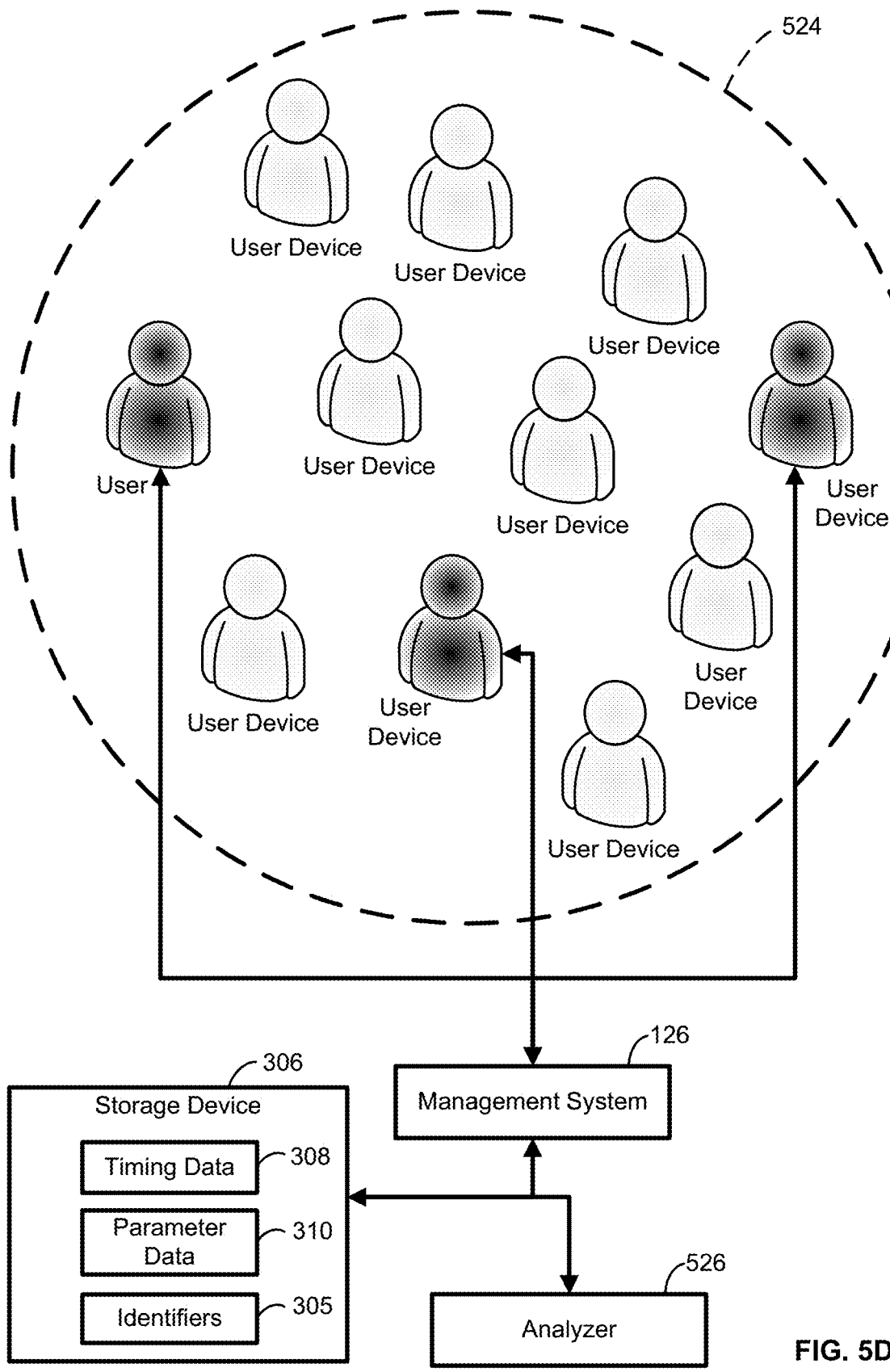
FIG. 5D is a block diagram of an example system.

In step 512, second data can be monitored. In an aspect, the second data can be accessed or received from the one or more data sources of a classification group 524, as shown in FIG. 5D. As an example, monitoring the second data can comprise accessing or receiving the second data and comparing the second data to a comparator. The comparator can be a function of the first data. As a further example, monitoring the second data can comprise accessing or receiving the second data and applying statistical analysis to the second data. In an aspect, an analyzer 526 (e.g., processor, software, computing device, etc.) can be configured to analyze one or more of the first data and the second data. As an example, the analyzer 526 can determine trends and/or statistical metrics between the first data and the second data. Statistical analysis can comprise inspection of standard aggregation functions such as minimum and maximum, time series analysis, analysis of variance, classification, regression, relational analysis, machine learning and/or any comparative extensions of these methods. In an aspect, the second data can be related to a select device.

Returning to FIG. 5A, in step 514, it can be determined if the select device is part of the first classification group. If the select device is part of the first classification group, the second data can be associated with first identifier, at step 516. In an aspect, the first identifier can operate as an identification of the relationship between the second data and the one or more classifiers used to generate the classification group.

In step 518, it can be determined if the select device is part of the first classification group. If the select device is part of the first classification group, the second data can be associated with first identifier, at step 520. In an aspect, the second identifier can operate as an identification of the relationship between the second data and the one or more classifiers used to generate the classification group.

Figure 6:
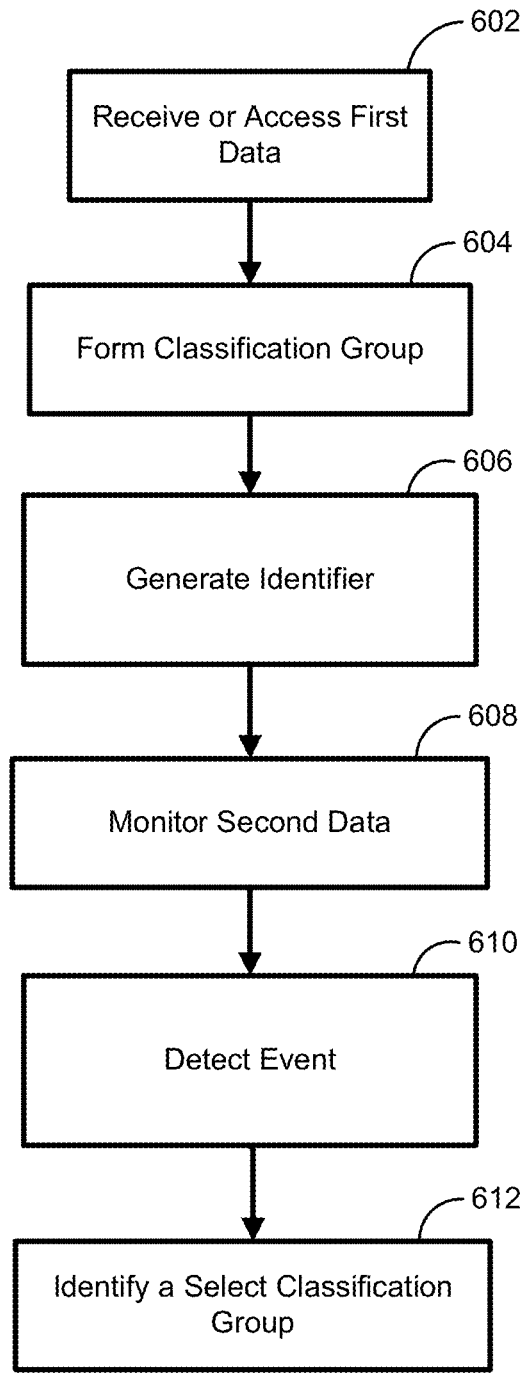
FIG. 6 is a flow chart of an example method.

FIG. 6 illustrates an exemplary method for data management. In step 602, first data can be accessed or received from one or more data sources such as devices or networks. As an example, the first data can be a measured parameter, performance value, or operational parameter, or a combination thereof. As a further example, the one or more data sources can comprise one or more user devices, computing devices, and/or network devices.

In step 604, forming a plurality of classification groups can be formed based upon one or more classifiers. In an aspect, the one or more classifiers can comprise a device name, port type, port name, geographic identifier, or market identifier, or a combination thereof.

In step 606, an identifier can be generated for each of the classification groups. In an aspect, one or more identifiers can be generated by applying a hash function to the first data received from the one or more data sources of the classification group. An identifier can be a bitstring, a character string, token, and the like.

In step 608, second data can be monitored. In an aspect, the second data can be accessed or received from the one or more data sources of the classification group. As an example, monitoring the second data can comprise accessing or receiving the second data and comparing the second data to a comparator. The comparator can be a function of the first data. As a further example, monitoring the second data can comprise accessing or receiving the second data and applying statistical analysis to the second data.

In step 610, an event based upon the monitoring of the second data can be detected. An example event can comprise a classifier, such as "market", failing to report the expected number of polls as defined in a comparative statement. Such an event can indicate a reporting failure that requires local human intervention. Similarly, a class such as "manufacturer" can present an inferior statistical property such as variance over another class of "manufacturer", or not meet an engineering standard. More granular events can be captured by groupings of classifications, such as "manufacturer" and "firmware revision", or other combinations. As a further example, the detection of one or more events can provide an efficient means to capture and compute any such combination of classifiers and their respective reporting metrics. Additionally, machine learning methods can be applied to the data, particularly to mine unknown events expressed within the data, to extrapolate or derive valuable business intelligence that may not be expected or known a priori.

In step 612, a select classification group can be identified based upon one or more of the generated identifiers. Once identified, the data associated with the select classification group can be retrieved, processed, and/or analyzed. As an example, an identifier can be generated for each of the classification groups. The one or more generated identifiers provides a means to compare and associate data sharing the same classification groupings, while minimize computational cost.

Figure 7:
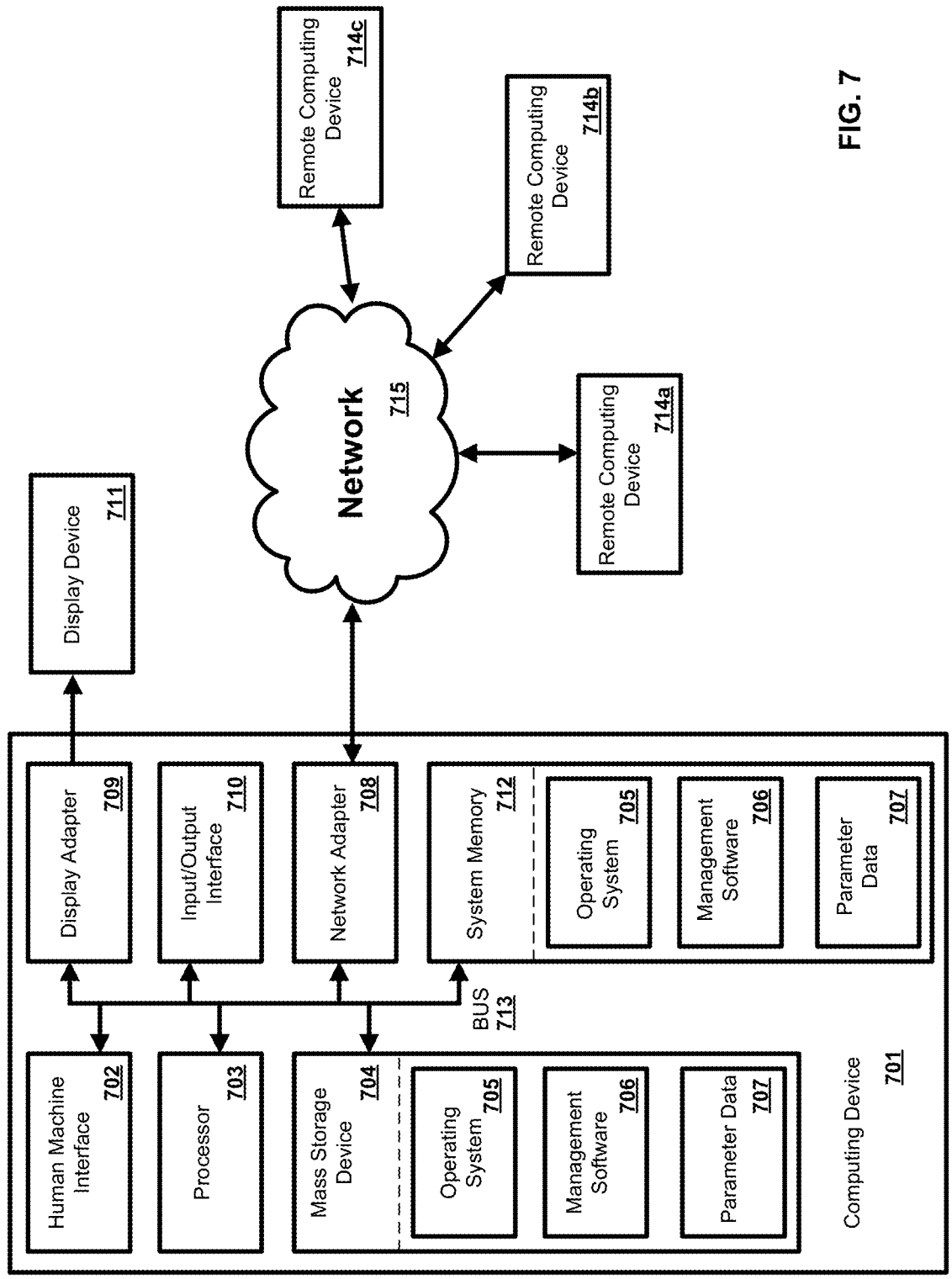
FIG. 7 is a block diagram of an example computing device.

In an aspect, the methods and systems can be implemented on a computing system such as computing device 701 as illustrated in FIG. 7 and described below. By way of example, management system 126 of FIG. 2 can be a computing device as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, management software 706, parameter data 707, a network adapter 708, system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computing device 701 typically comprises a variety of computer readable media. Exemplary readable media can be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as parameter data 707 and/or program modules such as operating system 705 and management software 706 that are immediately accessible to and/or are presently operated on by the processing unit 703.

In another aspect, the computing 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing device 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and management software 706. Each of the operating system 705 and management software 706 (or some combination thereof) can comprise elements of the programming and the management software 706. Parameter data 707 can also be stored on the mass storage device 704. Parameter data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, visual systems such as Microsoft's Kinect, audio systems that process sound such as music or speech, a traditional silver remote control, tactile input devices such as gloves, touch-responsive screen, body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computing device 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display 711 and computing device 701 can be part of one device, or separate devices.

The computing device 701 can operate in a networked environment using logical connections to one or more remote computing devices 714*a,b,c*. By way of example, a remote computing device can be a personal computer, portable computer, a smartphone, a server, a router, a network computer, a peer device or other common network node, and so on. Logical connections between the computing device 701 and a remote computing device 714*a,b,c* can be made via a network 715, such as a local area network (LAN) and a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of management software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, at a first time, from a first device, first data associated with the first device, wherein the first data comprises a plurality of parameters of the first device and a first plurality of classifiers associated with the first device;
   determining, based on applying a hash function to the first plurality of classifiers associated with the first device, an identifier of a classification group;
   associating the identifier of the classification group with the first data;
   receiving, at a second time, from a second device, second data, wherein the second data comprises a plurality of parameters of the second device and a second plurality of classifiers associated with the second device;
   determining, based on applying the hash function to the second plurality of classifiers associated with the second device, the identifier of the classification group; and
   associating the identifier of the classification group with the second data.

2. The method of claim 1, wherein receiving the first data comprises:
   determining the plurality of parameters of the first device, wherein the plurality of parameters of the first device comprises one or more of: a capacity parameter, a bandwidth utilization parameter, a resource utilization parameter, a buffer status parameter, a percent utilization parameter, a data rate parameter, or a congestion parameter; and
   classifying, via the first plurality of classifiers, the plurality of parameters of the first device.

3. The method of claim 1, wherein determining, based on applying the hash function to the first plurality of classifiers associated with the first device, the identifier of the classification group comprises determining a first hash token indicative of the first plurality of classifiers used to classify the first data.

4. The method of claim 1, wherein receiving the second data comprises:
   determining the plurality of parameters of the second device, wherein the plurality of parameters of the second device comprises one or more of: a capacity parameter, a bandwidth utilization parameter, a resource utilization parameter, a buffer status parameter, a percent utilization parameter, a data rate parameter, or a congestion parameter; and
   classifying, via the second plurality of classifiers, the plurality of parameters of the second device.

5. The method of claim 1, wherein determining, based on applying the hash function to the second plurality of classifiers associated with the second device, the identifier of the classification group comprises determining a second hash token indicative of the second plurality of classifiers used to classify the second data.

6. The method of claim 1, further comprising storing, based on the identifier of the classification group, one or more of the first data or the second data.

7. The method of claim 1, wherein one or more of the first plurality of classifiers or the second plurality of classifiers comprises one or more of: a device name, a port type, a port name, a geographic identifier, a converged regional area network (CRAN), a market location, a market identifier, a device type, or a user association.

8. A method comprising:
receiving, at a first time, first data from one or more devices, wherein the first data comprises a plurality of parameters of each device of the one or more devices and a plurality of classifiers;
determining, based on applying a hash function to the plurality of classifiers, an identifier of a classification group;
associating the identifier of the classification group with the first data;
receiving, at a second time, second data from a device of the one or more devices, wherein the second data comprises a plurality of parameters of the device of the one or more devices and the plurality of classifiers;
determining, based on applying the hash function to the plurality of classifiers, the identifier of the classification group; and
associating the second data with the identifier of the classification group.

9. The method of claim 8, wherein receiving the first data comprises:
determining the plurality of parameters of each device of the one or more devices, wherein the plurality of parameters of each device of the one or more devices comprises one or more of: a capacity parameter, a bandwidth utilization parameter, a resource utilization parameter, a buffer status parameter, a percent utilization parameter, a data rate parameter, or a congestion parameter; and
classifying, via the plurality of classifiers, the plurality of parameters of each device of the one or more devices.

10. The method of claim 8, wherein determining, based on applying the hash function to the plurality of classifiers, the identifier of the classification group comprises determining a first hash token indicative of the plurality of classifiers used to classify the first data.

11. The method of claim 8, further comprising determining the plurality of classifiers, wherein the plurality of classifiers comprises one or more of: a device name, a port type, a port name, a geographic identifier, a converged regional area network (CRAN), a market location, a market identifier, a device type, or a user association.

12. The method of claim 8, wherein receiving the second data comprises:
determining the plurality of parameters of the device of the one or more devices, wherein the plurality of parameters of the device of the one or more devices comprises one or more of: a capacity parameter, a bandwidth utilization parameter, a resource utilization parameter, a buffer status parameter, a percent utilization parameter, a data rate parameter, or a congestion parameter; and
classifying, via the plurality of classifiers, the plurality of parameters of the device of the one or more devices.

13. The method of claim 8, wherein determining, based on applying the hash function to the plurality of classifiers, the identifier of the classification group comprises determining a second hash token indicative of the plurality of classifiers used to classify the second data.

14. The method of claim 8, further comprising storing, based on the identifier of the classification group, one or more of the first data or the second data.

15. The method of claim 8, further comprising storing, based on the identifier of the classification group, one or more of the first data or the second data.

16. A method comprising:
receiving, at a first time, first data from a device, wherein the first data comprises a first plurality of parameters of the device;
determining, based on applying a hash function to a plurality of classifiers associated with the device, an identifier of a classification group, wherein the identifier of the classification group is associated with the first data;
receiving, at a second time, second data from the device, wherein the second data comprises a second plurality of parameters of the device;
determining, based on the second plurality of parameters, an event; and
determining, based on the event and based on applying the hash function to the plurality of classifiers associated with the device, the identifier of the classification group, wherein the event is associated with the identifier of the classification group.

17. The method of claim 16, wherein one or more of the first plurality of parameters of the device or the second plurality of parameters of the device comprises one or more of: a capacity parameter, a bandwidth utilization parameter, a resource utilization parameter, a buffer status parameter, a percent utilization parameter, a data rate parameter, or a congestion parameter.

18. The method of claim 16, wherein the plurality of classifiers comprises one or more of: a device name, a port type, a port name, a geographic identifier, a converged regional area network (CRAN), a market location, a market identifier, a device type, or a user association.

19. The method of claim 16, further comprising comparing the second plurality of parameters to the first plurality of parameters, wherein determining the event is based on a result of the comparison.

20. The method of claim 16, wherein the event comprises one or more of a reporting failure associated with a content playback time, a failure of the device to satisfy an engineering standard, a variance in performance of the device relative to another device, or an out-of-date firmware version.

* * * * *